No. 682,190. Patented Sept. 10, 1901.
W. H. HASLETT.
APPARATUS FOR HEATING AIR OR GASES.
(Application filed Jan. 19, 1901.)
(No Model.)
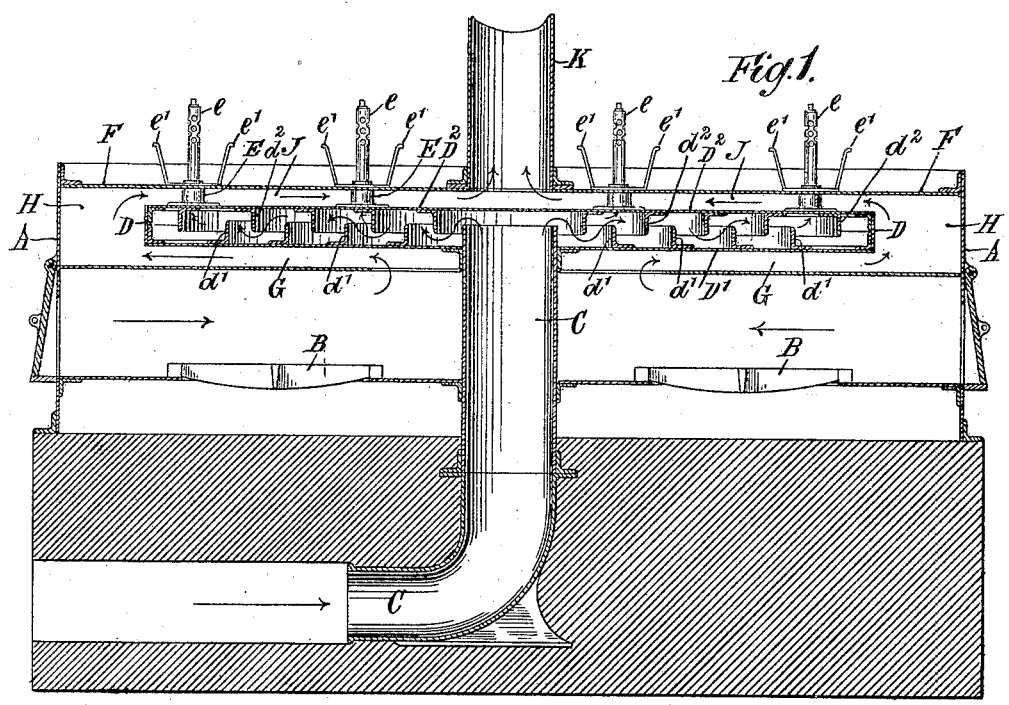
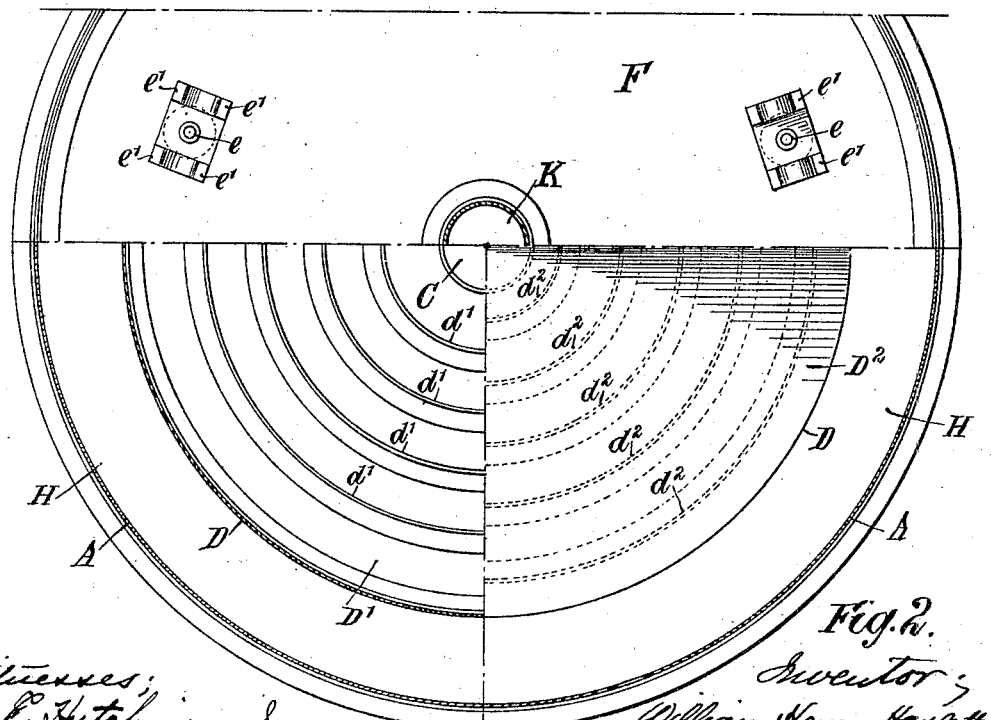

United States Patent Office.

WILLIAM HENRY HASLETT, OF KESTON, ENGLAND, ASSIGNOR OF ONE-HALF TO HERBERT SAMUEL RUSSELL, OF LONDON, ENGLAND.

APPARATUS FOR HEATING AIR OR GASES.

SPECIFICATION forming part of Letters Patent No. 682,190, dated September 10, 1901.

Application filed January 19, 1901. Serial No. 43,898. (No model.)

*To all whom it may concern:*

Be it known that I, WILLIAM HENRY HASLETT, engineer, a subject of the Queen of Great Britain, residing at Phoenix House, Keston, in the county of Kent, England, have invented a certain new and useful Apparatus for Heating Air or Gases, of which the following is a specification.

This invention relates to apparatus for heating air or gases, and is more especially intended for heating air preparatory to its admission to the interior of wooden casks, barrels, or like vessels for the purpose of drying the same and opening the pores.

The object of the invention is to simplify the construction of apparatus of this character.

In the accompanying drawings, Figure 1 is a sectional side elevation, and Fig. 2 is a partly-sectional plan, of the apparatus adapted for heating air to be afterward admitted into casks.

The same parts where they occur are lettered to correspond in both figures.

According to this invention I make the heater in the form of a vertical cylinder A, or it may be in the form of a prism, with one, two, or more furnace fire-grates B arranged radially therein. The air to be heated passes through a central tube C in the cylinder or other vessel A into a heating-box D, arranged horizontally and fitted on the inside with baffle-plates $d'$ and $d$, secured alternately to the bottom D' and top D, respectively, of the said box D. The top D of the heating-box D is fitted with a suitable number of outlet-pipes E, which pass through the upper plate or cover F of the heater and are fitted with perforated nozzles $e$ and racks $e'$ to receive the barrels or the like. The products of combustion from the furnace or furnaces B are carried off through flues G, H, and J, passing under and over the heating-box D, and thence reach a central chimney K.

Having fully described my invention, what I claim, and desire to secure by Letters Patent, is—

1. Apparatus for heating air or gases comprising a vertical body with fire-grates and flues therein, a central air-supply pipe, a heater-box in said body located around and communicating with said supply-pipe, baffle-plates secured to the top and bottom of said heater-box, and arranged to alternate therein and air-outlet pipes secured on said heater-box top and passing through the top cover of the vertical body, substantially as described.

2. Apparatus for heating air or gases, comprising a vertical body with a fire-box and flues therein, an air-heating box inclosed in said body and surrounded by the flues, an air-supply pipe passing through the fire-box into the center of the air-heater, a central chimney, and air-outlet pipes leading from the air heater box outside of the chimney through the top cover of the vertical body.

3. Apparatus for heating air or gases, comprising a vertical body having a fire-box, a central opening above the fire-box, an air-heating box inclosed in the body of the heater above the opening, a central chimney, flues surrounding the air-heating box and communicating with the central opening below and the central chimney above said box, an air-inlet pipe leading through the fire-box into the center of the air-heating box, and air-outlet pipes leading from said air-heating box outside of the chimney through the cover of the vertical body.

4. Apparatus for interiorly heating casks, barrels and the like, comprising a vertical body with a fire-box and flues inclosed therein, an air-heating box inclosed within said body and surrounded by the flues, an air-supply pipe passing through the fire-box into the air-heating box, a chimney connecting with the flue-space within the body, air-outlet pipes leading through the top of the vertical body, and racks or supports on said top cover for the articles to be heated, said outlet-pipes being provided with nozzles adapted to enter the articles supported on said racks.

WILLIAM HENRY HASLETT.

Witnesses:
   G. D. NEVILLE,
   WALTER J. SKERTEN.